(12) United States Patent  
Katwala et al.

(10) Patent No.: US 12,688,319 B2  
(45) Date of Patent: Jul. 21, 2026

(54) EMBEDDED NEXT GENERATION ACCESS CONTROL SYSTEM AND IMPOSING FINE-GRAINED ACCESS CONTROL OF DATA IN A DATABASE

(71) Applicant: Government of the United States of America, as represented by the Secretary of Commerce, Gaithersburg, MD (US)

(72) Inventors: Gopi Katwala, Germantown, MD (US); David Frank Ferraiolo, Ashburn, VA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 212 days.

(21) Appl. No.: 18/435,671

(22) Filed: Feb. 7, 2024

(65) Prior Publication Data

US 2024/0265125 A1 Aug. 8, 2024

Related U.S. Application Data

(60) Provisional application No. 63/443,739, filed on Feb. 7, 2023.

(51) Int. Cl.  
*G06F 21/62* (2013.01)

(52) U.S. Cl.  
CPC ................................. *G06F 21/6218* (2013.01)

(58) Field of Classification Search  
CPC .......................... G06F 21/6218; G06F 21/6227  
See application file for complete search history.

(56) References Cited

U.S. PATENT DOCUMENTS 10,127,393 B2 * 11/2018 Ferraiolo .............. G06F 16/284

OTHER PUBLICATIONS

Ferraiolo, D., et al., "Imposing Fine-grain Next Generation Access Control over Database Queries", 2nd ACM Workshop on Attribute Based Access Control (ABAC '17), 2017, p. 1-7, DOI: https://doi.org/10.1145/3041048.3041050, Accessed: Apr. 29, 2024.

(Continued)

*Primary Examiner* — Han Yang  
(74) *Attorney, Agent, or Firm* — Office of Chief Counsel for National Institute of Standards and Technology

(57) ABSTRACT

An embedded next generation access control system imposes fine-grained access control on data in a resource database and includes a resource database, NGAC database, administrator, and mediator. The resource database includes controlled resource data and a mediator. The NGAC database includes an adjudicator and access control policy data. The administrator communicates access control policy input to the NGAC database upon which access control policy data is made in the NGAC database. The controlled resource data is access controlled by access control policy data via calls of an adjudicator API, which implements Next Generation Access Control standard by NIST, by the resource database to obtain access decisions. The adjudicator determines which controlled resource data are accessed by a user and provides an access control list for each user and user attribute. The adjudicator also provides a prohibited access control list for a user and user attributes in the access control policy data if there are any.

20 Claims, 3 Drawing Sheets

(56) References Cited

OTHER PUBLICATIONS

Axiomatics, "Axiomatics Data Access Filter: Next generation data-centric security", Axiomatics.com, 2021, p. 1-24, DOI: https://www.axiomatics.com/wp-content/uploads/2015/12/Next-Generation-Data-centric-Security_-Axiomatics-Data-Access-Filter-White-Paper.pdf, Accessed: Apr. 29, 2024.
Oracle Database, "Oracle Database 19c", Oracle Database, 2020, p. 1-20, DOI: https://www.oracle.com/a/tech/docs/collateral/wp-ras-19c.pdf, Accessed: Apr. 29, 2024.

* cited by examiner

EMBEDDED NEXT GENERATION ACCESS CONTROL SYSTEM AND IMPOSING FINE-GRAINED ACCESS CONTROL OF DATA IN A DATABASE

CROSS REFERENCE TO RELATED APPLICATIONS

This application claims the benefit of U.S. Provisional Patent Application Ser. No. 63/443,739 (filed Feb. 7, 2023), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is a an embedded next generation access control system for imposing fine-grained access control on data in a resource database, comprising: a resource database in communication with an NGAC database and in communication with a user, and that comprises a mediator and controlled mediator data; an NGAC database in communication with the resource database and in communication with an administrator, and that comprises an adjudicator and access control policy data; an administrator in communication with the NGAC database, and that communicates access control policy input to the NGAC database upon which access control policy data is made in the NGAC database, and receives adjudicator feedback information from the adjudicator; controlled resource data disposed in the mediator, and that has access controlled by access control policy data via calls of an adjudicator API in an NGAC schema by the resource database to obtain the access decisions; access control policy data disposed in the adjudicator, and that comprises a list of users and a list of permissions; a mediator contained in the resource database, and that comprises the controlled mediator data, such that the mediator receives a user query from the user, makes an adjudicator call based on the user query in response to receipt of the user query, communicates the adjudicator call to the NGAC database, receives an access decision from the NGAC database, makes a mediator response based on the access decision in response to receipt of the access decision, and communicates the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database; an adjudicator contained in the NGAC database, and that comprises the access control policy data, such that the adjudicator receives access control policy input from the administrator, makes the access control policy data based on the access control policy input, receives the adjudicator call from the resource database, checks the access control policy data about the adjudicator call, determines control of access to the controlled resource data by the user, makes an access decision based on the determination of control of access, and communicates the access decision to the mediator; and an embedded next generation access controller that comprises the resource database and the NGAC database, and is implemented in the database schema for the resource database, uses database views to change the user query to a policy preserving query, builds an access control list to facilitate computation of policy decisions, enforces policy within the resource database to the user and SQL editors, updates the list of columns in the controlled resource data in an absence of modifying the where clause in the user query, and updates the user query so that only accessible columns are retrieved and other columns are returned as a static text 'protected' for every row in the scope of the user query.

Disclosed is a process for imposing fine-grained access control on data in a resource database, the process comprising: receiving a user query from a user; making an adjudicator call based on the user query in response to receipt of the user query; communicating the adjudicator call to an NGAC database; receiving an access decision from the NGAC database; making a mediator response based on the access decision in response to receipt of the access decision; and communicating the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
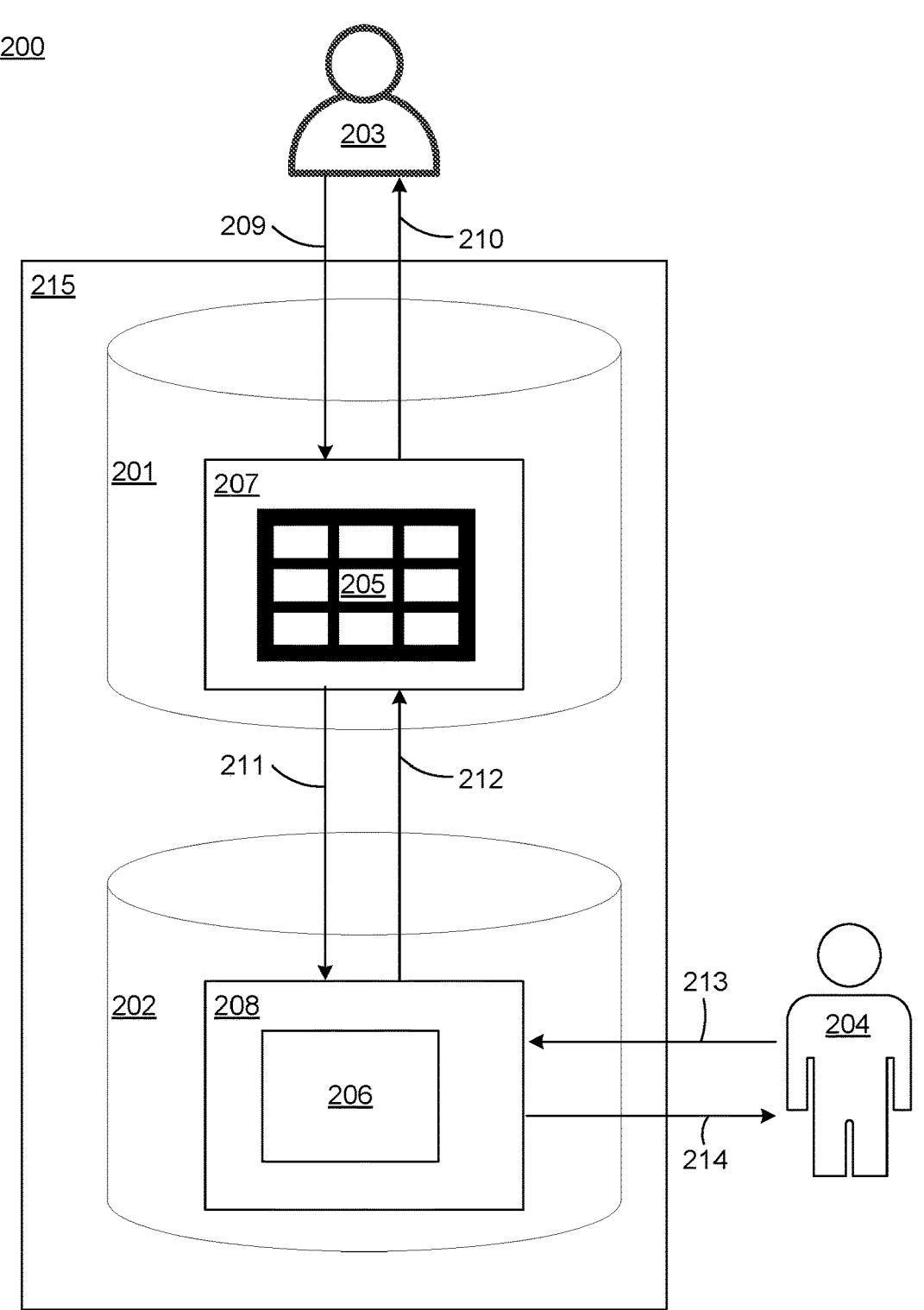
FIG. 1 shows, according to some embodiments, an embedded next generation access control system 200.

A detailed description of one or more embodiments is presented herein by way of exemplification and not limitation.

Conventional access control systems typically rely on a decentralized server to manage access to data. This approach has several limitations, including that it can be difficult to scale to large numbers of users and data sets. Moreover, it can be difficult to manage access policies, as they must be centrally configured and managed. Further, it can be difficult to provide fine-grained access control, as users are typically granted access to entire data sets or tables.

Embedded next generation access control system 200 overcomes these limitations by centralizing access control, notably in individual databases. Embedded next generation access control system 200 can include resource database 201 that is embedded, e.g., in a database server that stores the data. Resource database 201 is responsible for enforcing access control policies. Advantageously, embedded next generation access control system 200 is scalable to large numbers of users and data sets. Embedded next generation access control system 200 is easier to manage access policies, as they can be configured locally on each database server. Embedded next generation access control system 200 provides fine-grained access control as users can be granted access to individual rows or columns in a data set.

Embedded next generation access control system 200 also provides several benefits over conventional access control systems. Embedded next generation access control system 200 is more secure, as it does not expose access control policies to unauthorized users. Embedded next generation access control system 200 is more flexible because embedded next generation access control system 200 can be easily adapted to changes in the data or access requirements.

Embedded next generation access control system 200 imposes fine-grained access control on data in resource database 201. In an embodiment, with reference to FIG. 1, FIG. 2, and FIG. 3, embedded next generation access control system 200 includes: resource database 201 in communication with NGAC database 202 and user 203, resource database 201 including mediator 207 and controlled resource data 205; NGAC database 202 in communication with resource database 201 and administrator 204, NGAC database 202 comprising adjudicator 208 and access control policy data 206; administrator 204 in communication with NGAC database 202, administrator 204 communicating access control policy input 213 to NGAC database 202 upon which access control policy data 206 is made in NGAC database 202 and receiving adjudicator feedback information 214 from adjudicator 208; controlled resource data 205 disposed in mediator 207, controlled resource data 205 having access controlled by access control policy data 206 via calls of an adjudicator API by resource database 201 in an NGAC schema to obtain access decisions; access control policy data 206 disposed in adjudicator 208, access control policy data 206 including a list of users and a list of permissions; mediator 207 disposed in resource database 201, mediator 207 including controlled resource data 205, such that mediator 207 receives user query 209 from user 203, makes adjudicator call 211 based on user query 209 in response to receipt of user query 209, communicates adjudicator call 211 to NGAC database 202, receives access decision 212 from NGAC database 202, makes mediator response 210 based on access decision 212 in response to receipt of access decision 212, and communicates mediator response 210 to user 203 as a response to user query 209, such that resource database 201 calls an adjudicator API in an NGAC schema via adjudicator call 211 and obtains access decisions to controlled resource data 205 from access decision 212, wherein embedded next generation access control system 200 controls access by user 203 to row data and field data of controlled resource data 205 in resource database 201; adjudicator 208 disposed in NGAC database 202, adjudicator 208 including access control policy data 206, such that adjudicator 208 receives access control policy input 213 from administrator 204, makes access control policy data 206 based on access control policy input 213, receives adjudicator call 211 from resource database 201, checks access control policy data 206 about adjudicator call 211, determines control of access to controlled resource data 205 by user 203, makes access decision 212 based on the determination of control of access, and communicates access decision 212 to mediator 207; and embedded next generation access controller 215 that includes resource database 201 and NGAC database 202 and is implemented in the database schema for resource database 201, embedded next generation access controller 215 using database views to change user query 209 to a policy preserving query, building an access control list to facilitate computation of policy decisions, enforcing policy within resource database 201 to user 203 and SQL editors, updating the list of columns resource data without modifying the WHERE clause in user query 209, and updating user query 209 so that only accessible columns are retrieved and other columns are returned as a static text 'protected' for every row in the scope of user query 209.

In an embodiment, embedded next generation access control system 200 includes: user query 209 that includes information about user 203 and a request for data from controlled resource data 205, such that the data that is requested includes data arranged in a field of controlled resource data 205, and the information identifies the particular user that communicated user query 209; mediator response 210 that includes any accessible data from controlled resource data 205 as determined by access control policy data 206 that is communicated from embedded next generation access controller 215 to user 203 in response to user query 209; adjudicator call 211 that includes the query from mediator 207 that is based on user query 209; access decision 212 that includes the access control decision based on access control policy data 206; access control policy input 213 that includes instructions to build access control policy data 206 in adjudicator 208; and adjudicator feedback information 214.

In an embodiment, embedded next generation access control system 200 includes user 203 in communication with resource database 201 that uses a resource schema to obtain accessible portions of controlled resource data 205 in resource database 201, communicates user query 209 to resource database 201, and receives mediator response 210 from resource database 201 in response to communicating user query 209 to resource database 201, such that user 203 has no access to the NGAC schema upon which access to all of controlled resource data 205 is controlled within resource database 201.

In an embodiment, user query 209 includes a query, and the query is a SELECT query. In an embodiment, mediator 207 changes the query and retrieves only the granted columns per individual row per access decision 212 from adjudicator 208. In an embodiment, user query 209 further comprises a WHERE clause that is unchanged by mediator 207. In an embodiment, embedded next generation access control system 200 accessible data in controlled resource data 205 is communicated to user 203 in mediator response 210, and columns in controlled resource data 205 with denied access are communicated to user 203 as 'protected' in mediator response 210.

In an embodiment, embedded next generation access control system 200 includes a query selected from the group consisting of an UPDATE query, an INSERT query, and a DELETE query, wherein user query 209 comprises the query. In an embodiment, mediator 207 does not modify the query. In an embodiment, mediator 207 does not change the columns or the WHERE clause of user query 209 resource data. In an embodiment, the query is executed if the query is granted, and the query is not executed if the query is denied.

In an embodiment, adjudicator 208 determines permissions user 203 has on a given row and column of controlled resource data 205 in resource database 201. In an embodiment, adjudicator 208 determines if user 203 is permitted a given operation on a given column of controlled resource data 205. In an embodiment, adjudicator 208 determines which columns of controlled resource data 205 are accessed with what operations by user 203. In an embodiment, adjudicator 208 provides an access control list for each user and user attribute in access control policy data 206. In an embodiment, adjudicator 208 provides a prohibited access control list for user 203 and user attributes in access control policy data 206 if there are any.

Embedded next generation access control system 200 is a system for imposing fine-grained access control on data in resource database 201. In an embodiment, embedded next generation access control system 200 includes resource database 201, NGAC database 202, administrator 204, controlled resource data 205, access control policy data 206, mediator 207, and adjudicator 208. Resource database 201 stores controlled resource data 205. Controlled resource data 205 is data that is subject to access control. NGAC database 202 stores access control policy data 206. Access control policy data 206 defines the permissions that users have on controlled resource data 205. Administrator 204 is responsible for creating and managing access control policy data 206. Mediator 207 is a component of resource database 201 that is responsible for enforcing access control policy data 206. Mediator 207 receives user queries 209 from user 203. The user queries 209 are requests for data from controlled resource data 205. Mediator 207 makes adjudicator calls 211 to NGAC database 202. The adjudicator calls 211 are requests for access decisions from adjudicator 208. Adjudicator 208 is a component of NGAC database 202 that is responsible for making access decisions. Adjudicator 208 receives the adjudicator calls 211 from mediator 207. Adjudicator 208 checks access control policy data 206 to determine if user 203 is authorized to access the requested data. Adjudicator 208 makes access decisions 212 based on the check of access control policy data 206. The access decisions 212 indicate whether user 203 is authorized to access the requested data. Mediator 207 receives the access decisions 212 from adjudicator 208. Mediator 207 makes mediator responses 210 based on the access decisions 212. The mediator responses 210 are responses to the user queries 209. The mediator responses 210 indicate whether user 203 is authorized to access the requested data. If user 203 is authorized to access the requested data, the mediator responses 210 include the requested data. If user 203 is not authorized to access the requested data, the mediator responses 210 include an error message.

Embedded next generation access control system 200 has advantageous properties. Embedded next generation access control system 200 is fine-grained, wherein embedded next generation access control system 200 can control access to individual rows and columns of data. Embedded next generation access control system 200 is dynamic, wherein embedded next generation access control system 200 can be updated to reflect changes in the access control policy. Embedded next generation access control system 200 is efficient, wherein embedded next generation access control system 200 does not require any changes to the underlying database schema. Embedded next generation access control system 200 is secure, wherein embedded next generation access control system 200 uses a variety of security measures to protect data from unauthorized access.

It should be appreciated that next generation access control (NGAC) is an advanced approach to access control that goes beyond traditional methods. NGAC can be implemented with adherence to an ANSI/INCITS/ANSI standard, INCITS 565-2020 (Information Technology—Next Generation Access Control (NGAC). Conventionally NGAC is implemented within a database such as NGAC database 206. Herein, controls are embedded directly in resource database 201 to include mediator 207. NGAC consolidates access control policies from various systems and applications into a single, unified framework. This simplifies policy management and enhances consistency. NGAC takes into account contextual factors such as user identity, location, device, and time when making access decisions. This enables more granular and adaptive access control. NGAC employs continuous authentication mechanisms to verify user identities throughout a session, reducing the risk of unauthorized access. NGAC leverages attribute-based access control (ABAC), which allows access decisions to be based on user attributes, resource attributes, and environmental conditions. This provides more flexibility and fine-grained control. NGAC has dynamic policy enforcement such that policies can be dynamically adjusted based on real-time conditions, ensuring that access controls remain aligned with changing requirements.

In an embodiment, resource database 201 is a database that stores controlled resource data 205.

In an embodiment, NGAC database 202 is a database that stores access control policy data 206. This data includes information about which users have access to which data, and what operations they are allowed to perform on that data. NGAC database 202 also stores information about the columns in resource database 201 that are accessible to each user. NGAC database 202 is used to determine whether a user is allowed to access a particular row and column of data in resource database 201. It does this by checking access control policy data 206 to see if the user is authorized to access the data. If the user is authorized, mediator 207 will allow the user to access the data. If the user is not authorized, mediator 207 will deny the user access to the data.

In an embodiment, NGAC database 202 provides an access control list for each user and user attribute in access control policy data 206. This list specifies which columns of data the user is allowed to access, and what operations they are allowed to perform on that data. NGAC database 202 also provides a prohibited access control list for user 203 and user attributes in access control policy data 206 if there are any. This list specifies which columns of data the user is not allowed to access, and what operations they are not allowed to perform on that data.

User 203 uses embedded next generation access control system 200. User 203 may have full authorization, partial authorization, or no authorization to access controlled resource data 205 in resource database 201. User 203 can be identified by a user ID, password, Internet protocol address, biometric data, or the like. User 203 has a set of permissions that determine what data they are authorized to access and what operations they are authorized to perform on that data. Permissions for user 203 are determined by access control policy data 206. User 203 can be, e.g., a human user, software program, mechanical operation, electrical operation, optical operation, or a combination of these.

User 203 can have various properties including: a user ID that can be a unique identifier for user 203; a password that can be a secret string that user 203 uses to authenticate themselves; permissions that can determine what data user 203 is authorized to access and what operations they are authorized to perform on that data; a set of roles that user 203 is assigned to, wherein roles determine what data user 203 is authorized to access and what operations they are authorized to perform on that data; a set of groups that user 203 is a member of, wherein groups determine what data user 203 is authorized to access and what operations they are authorized to perform on that data; a set of attributes that describe user 203, wherein attributes can be used to further refine user 203's permissions; a current status of user 203, wherein the status can be active, inactive, or blocked; a created date that includes the date and time that user 203 was created; an updated date that includes the date and time that user 203 was last updated; a deleted date that can include the date and time that user 203 was deleted; notes that includes any additional notes about user 203; and the like.

In an embodiment, administrator 204 manages access control policy data 206 in NGAC database 202. Administrator 204 can add, modify, or delete access control policies, and can view audit logs of access attempts. Administrator 204 can have a valid username and password in order to access NGAC database 202. Administrator 204 can be responsible for ensuring that access control policy data 206 is accurate and up to date. Administrator 204 can be aware of the potential security risks associated with access control and can take steps to mitigate those risks.

In an embodiment, controlled resource data 205 is a set of data that is stored in resource database 201 and that is access-controlled by access control policy data 206. Controlled resource data 205 can include any type of data, such as tables, views, or stored procedures. Controlled resource data 205 is accessed by users through resource database 201. Resource database 201 is a database that is designed to provide access to data in a controlled manner. Resource database 201 can include a number of features that are designed to protect the data, such as access control lists, auditing, and encryption.

In an embodiment, access control policy data 206 is used to determine whether a particular user 203 has access to specific controlled resource data 205 in resource database 201. Access control policy data 206 are defined by administrator 204 and stored in NGAC database 202. Access control policy data 206 can include various properties, including: the users who are allowed to access the data; groups of users who are allowed to access the data; the roles that users can have, which determine what data they are allowed to access; the permissions that users have, which determine what operations they are allowed to perform on the data; the data that is being protected by the access control policy; the columns of data that are being protected by the access control policy; the operations that users are allowed to perform on the data; the conditions that must be met in order for a user to be granted access to the data; and the like. It is contemplated that access control policy data 206 is used by adjudicator 208 to determine whether a user is allowed to access a particular piece of data. Adjudicator 208 checks access control policy data 206 to see if the user is, e.g., in a group that is allowed to access the data, if the user has a role that is allowed to access the data, if the user has the permission to access the data, or if the user meets the conditions for accessing the data. If certain conditions are met, then the user is allowed to access the data by mediator 207. Otherwise, the user is denied access to the data. Access control policy data 206 protects data from unauthorized access. By defining the users, groups, roles, permissions, data, columns, operations, and conditions, administrator 204 can ensure that only authorized users have access to the data.

Access control policy data in NGAC for database access control can include the various elements. Subjects: The users or groups who are requesting access to the database. Objects: The data or resources in the database that are being requested. Actions: The operations that the users are requesting to perform on the data, such as reading, writing, or deleting. Conditions: The context-specific criteria that must be met for the access request to be granted, such as the user's location, the device they are using, or the sensitivity of the data. Permissions: The specific permissions that are granted to the users for the given context, such as the ability to read, write, or delete the data.

In an embodiment, mediator 207 is a database component that enforces access control policies on data (e.g., controlled resource data 205) in resource database 201. Mediator 207 receives user queries 209 from user 203, makes adjudicator calls 211 based on user queries 209, communicates adjudicator calls 211 to NGAC database 202, receives access decisions 212 from NGAC database 202, makes mediator responses 210 based on access decisions 212, and communicates mediator responses 210 to user 203 as a response to the user queries 209.

Mediator 207 is implemented in the database schema for resource database 201. It uses database views to change user queries 209 to policy preserving queries, builds an access control list to facilitate computation of policy decisions, enforces policy within resource database 201 to user 203 and SQL editors, can update the list of columns in controlled resource data 205 in an absence of modifying the where clause for certain user queries 209, and can update user query 209 so that only accessible columns are retrieved and other columns are returned as a static text 'protected' for every row in the scope of user query 209.

In an embodiment, adjudicator 208 is a component of embedded next generation access control system 200 that determines permissions for users to access controlled resource data 205 in resource database 201. Adjudicator 208 receives access control policy input 213 from administrator 204, which specifies the permissions that each user has on each row and column of controlled resource data 205. Adjudicator 208 then uses this policy to determine whether a user is permitted to access a particular row or column of data, and if so, what operations they are allowed to perform on that data. Adjudicator 208 can maintain an access control list for each user and user attribute in access control policy data 206. This list specifies the rows and columns of data that the user is allowed to access, as well as the operations that they are allowed to perform on that data. Adjudicator 208 can maintain a prohibited access control list for user 203 and user attributes in access control policy data 206 if there are any. This list specifies the rows and columns of data that the user is not allowed to access, as well as the operations that they are not allowed to perform on that data. Adjudicator 208 uses the access control lists and prohibited access control lists to determine whether a user is permitted to access a particular row or column of data, and if so, what operations they are allowed to perform on that data. Adjudicator 208 also uses the access control lists and prohibited access control lists to enforce access control policies. If a user attempts to access a row or column of data that they are not authorized to access, adjudicator 208 will deny the request.

In an embodiment, user query 209 is a SQL query that is submitted by user 203 to resource database 201. User query 209 specifies the data that the user wants to retrieve from controlled resource data 205 in resource database 201. User query 209 is processed by mediator 207, which is a component of embedded next generation access control system 200. Mediator 207 communicates with adjudicator 208 to check access control policy data 206 to determine if user 203 is authorized to access the data that is specified in user query 209. If user 203 is authorized, mediator 207 then executes user query 209 and returns the results as mediator response 210 to user 203. If user 203 is not authorized, mediator 207 returns partial data that are authorized or returns an error message in mediator response 210 to user 203. User query

209 can be any valid SQL query. It is contemplated that User query 209 can be submitted in a way that is compatible with embedded next generation access control system 200 so that user query 209 is submitted in a way that allows mediator 207 to determine the identity of user query 209 and to check access control policy data 206 by adjudicator 208. User query 209 can be submitted in a variety of ways. For example, the query can be submitted through a web interface, through a command-line interface, or through a programmatic interface, or any suitable submission manner. User query 209 can be used to retrieve data from any table in resource database 201. User query 209 can be used to update or delete data from the database. User query 209 can be used to create a new field in controlled resource data 205. It should be appreciated that user query 209 can be made up of the following clauses: a SELECT clause that specifies the columns that are to be retrieved; a FROM clause specifies the table from which the data is to be retrieved; and a WHERE clause specifies the conditions that are met in order for controlled resource data 205 to be retrieved.

It should be appreciated that structured query language (SQL) is a programming language for managing and manipulating data stored in relational database management systems (RDBMS). It provides a comprehensive set of commands and statements to perform various operations on databases, making it a tool for database administrators, analysts, and developers. SQL is used to create and modify databases, define schemas, and insert, retrieve, update, and delete data. It also enables users to control user access, manage database security, and optimize database performance. Its versatility and adaptability have made it a typically used language for accessing and manipulating data in many relational database systems, including MySQL, PostgreSQL, Oracle, and SQL Server. In SQL, the SELECT statement is used to retrieve data from a database. It can specify the columns and rows to retrieve, as well as apply filters and sorting criteria. The DELETE statement is used to remove rows from a table. It specifies the criteria for selecting the rows to be deleted. The UPDATE statement is used to modify the data in existing rows of a table. It can specify the columns to be updated and the new values for those columns. The INSERT statement is used to add new rows to a table and can specify the values for each column in the new row. The WHERE clause is used to filter the rows returned by a SELECT statement and can specify the criteria for selecting the rows to be included in the result set. These commands provide database operations.

In an embodiment, mediator response 210 is a response generated by mediator 207 in response to user query 209. Mediator response 210 can includes the data (in whole, in part) from controlled resource data 205 that is requested by the user in user query 209 or can include an error message, indicative of disallowed access. The data may be in the form of rows and columns, or it may be in the form of a single value. Mediator response 210 can include permissions that the user has on the data. The permissions can be in the form of a list of operations that the user is allowed to perform on the data, or they can be in the form of a list of columns that the user is allowed to access. Mediator response 210 may include errors if user query 209 is not valid. The errors can be in the form of a list of error messages, or they can be in the form of a single error message. Mediator response 210 can include the status of user query 209. The status can be in the form of a success or failure message, or it can be in the form of a code that indicates the success or failure of user query 209. Mediator response 210 can include metadata about the data. The metadata can be in the form of a list of attributes about the data, or it can be in the form of a single attribute about the data. Mediator response 210 can be formatted in a way that is compatible with the user interface. The format of mediator response 210 can be in the form of a JSON object, text, or other object such as an XML document.

In an embodiment, adjudicator call 211 is a call made by resource database 201 to NGAC database 202. Adjudicator call 211 is made in response to user query 209. Adjudicator call 211 can include column data that was requested by user 203. Adjudicator call 211 can include the current user 203 that submitted the query. Adjudicator call 211 is used to determine whether user 203 is authorized to access controlled resource data 205. NGAC database 202 checks with adjudicator 208 and access control policy data 206 to determine if user 203 has permission to access controlled resource data 205. If user 203 does not have permission, NGAC database 202 can return an error or other non-access information in access decision 212 to mediator 207 in resource database 201. If user 203 does have permission, NGAC database 202 communicates access decision 212 that provides an access grant to mediator 207 that allows access to requested data within controlled resource data 205.

In an embodiment, access decision 212 is a response from adjudicator 208 to resource database 201. It indicates whether user 203 is permitted to access controlled resource data 205. Access decision 212 can be a string, a Boolean value (true or false), and the like. Access decision 212 is based on access control policy data 206. Access decision 212 is made by adjudicator 208 and communicated to resource database 201 so that access decision 212 can be used by resource database 201 to determine whether to grant or deny access to controlled resource data 205. Access decision 212 ensures that only authorized users are able to access controlled resource data 205.

In an embodiment, access control policy input 213 can include instructions that define how access to controlled resource data 205 is to be controlled. Access control policy input 213 is provided by administrator 204 to NGAC database 202. Access control policy input 213 can include the particular users who are authorized to access controlled resource data 205. Access control policy input 213 can define the operations that authorized users are permitted to perform on controlled resource data 205. Access control policy input 213 can define the columns of controlled resource data 205 that authorized users are permitted to access. Access control policy input 213 can define the conditions under which authorized users are permitted to access controlled resource data 205. Access control policy input 213 can define the actions that are to be taken if an unauthorized user attempts to access controlled resource data 205. Access control policy input 213 can be created or modified by administrator 204.

In an embodiment, adjudicator feedback information 214 is a set of data that is provided by adjudicator 208 to administrator 204. Adjudicator feedback information 214 can include information about access control policy data 206, user query 209, access decision 212, and mediator response 210. Adjudicator feedback information 214 can be used by administrator 204 to improve the performance of embedded next generation access control system 200. Administrator 204 can use adjudicator feedback information 214 to determine whether access control policy data 206 is accurate and up to date in adjudicator 208.

In an embodiment, embedded next generation access controller 215 combines receipt of user query 209 with access control decisions based on embedded controls for access to controlled resource data 205 in resource database 201. It can be implemented in the database schema for resource database 201, can involve database views to change user query 209 to a policy preserving query, can build an access control list to facilitate computation of policy decisions, can enforce policy within resource database 201 to user 203 and SQL editors, can update the list of columns in controlled resource data 205 in an absence of modifying the WHERE clause in user query 209, and can update user query 209 so that only accessible columns are retrieved and other columns are returned as a static text 'protected' for every row in the scope of user query 209.

In an embodiment, SELECT query 216 is a SQL query that is used to retrieve data from a database. User query 209 can be made up of a number of clauses, each of which specifies a different aspect of controlled resource data 205 that is sought to be retrieved from resource database 201. The SELECT clause specifies the columns that are to be retrieved. The other clauses in user query 209, such as the FROM clause and the WHERE clause, specify additional information about controlled resource data 205 that is to be retrieved. SELECT query 216 is used to retrieve data from controlled resource data 205 in resource database 201. In an embodiment, mediator 207 can change the query and retrieve only the granted columns per individual row per the access decision 212 from the adjudicator 208. In an embodiment, user query 209 further comprises a WHERE clause that is unchanged by the mediator 207. In an embodiment, accessible data in the controlled resource data 205 is communicated to the user 203 in the mediator response 210, and columns in the controlled resource data 205 with denied access are communicated to the user 203 as 'protected' in the mediator response 210.

In an embodiment, user query 209 includes a query selected from the group consisting of an UPDATE query, an INSERT query, and a DELETE query. In an embodiment, mediator 207 does not modify the query. In an embodiment, user query 209 further comprises resource data one or more columns and a WHERE clause that are not modified by mediator 207. In an embodiment, the query is executed if the query is granted, and the query is not executed if the query is denied.

In an embodiment, adjudicator 208 determines permissions user 203 has on a given row and column of controlled resource data 205 in resource database 201. In an embodiment, adjudicator 208 determines if user 203 is permitted a given operation on a given column of controlled resource data 205. In an embodiment, adjudicator 208 determines which columns of controlled resource data 205 are accessed with what operations by user 203. In an embodiment, adjudicator 208 provides an access control list for each user and user attribute in access control policy data 206. In an embodiment, adjudicator 208 provides a prohibited access control list for user 203 and user attributes in access control policy data 206 if there are any.

In an embodiment, an access control list (ACL) can be a list of users or groups that are granted or denied access to a particular resource. ACLs are often used in conjunction with a security policy to control access to files, folders, databases, and other resources. In the context of embedded next generation access control system 200, an ACL can include a list of users or groups that are granted or denied access to a particular row and column of controlled resource data 205 in resource database 201. The ACL can be stored in access control policy data 206 and used by adjudicator 208 to determine whether user 203 is permitted to access a particular row and column of controlled resource data 205. The ACL is generated by the adjudicator 208 automatically.

In an embodiment, the prohibited access control list can be a list of users and user attributes that are not permitted to access certain columns of controlled resource data 205. The list can be created by adjudicator 208 based on access control policy data 206. The prohibited access control list can be used to prevent user 203 from accessing all or portions of controlled resource data 205 that user 203 are not authorized to access.

In an embodiment, embedded next generation access control system 200 is made according to the following: creating resource database 201, wherein resource database 201 stores controlled resource data 205 and access control policy data 206; creating NGAC database 202 that stores adjudicator 208 and access control policy data 206; creating administrator 204 that is responsible for creating and managing access control policy data 206; creating controlled resource data 205 is created that is protected by the access control system; creating access control policy data 206 that specifies which users have access to which data and what operations they are allowed to perform on that data; creating adjudicator 208 that is enforces access control policy data 206; creating mediator 207 that communicates with adjudicator 208 and user 203.

In an embodiment, resource database 201, NGAC database 202, administrator 204, and access control policy data 206 is created by a database management system. Controlled resource data 205 can be created using a data management system. Access control policy data 206 can be created using a policy management system. Adjudicator 208 or mediator 207 can be created using a software development kit.

Embedded next generation access control system 200 has numerous advantageous and unexpected benefits and uses. In an embodiment, a process for imposing fine-grained access control on data in resource database 201 includes: receiving user query 209 from user 203; making adjudicator call 211 based on user query 209 in response to receipt of user query 209; communicating adjudicator call 211 to NGAC database 202; receiving access decision 212 from NGAC database 202; making mediator response 210 based on access decision 212 in response to receipt of access decision 212; and communicating mediator response 210 to user 203 as a response to user query 209, such that resource database 201 calls an adjudicator API in an NGAC schema via adjudicator call 211 and obtains access decisions to controlled resource data 205 from access decision 212, wherein embedded next generation access control system 200 controls access by user 203 to row data and field data of controlled resource data 205 in resource database 201. In the process, resource database 201 can include mediator 207 and controlled resource data 205, such that mediator 207 receives user query 209 from user 203, makes adjudicator call 211 based on user query 209 in response to receipt of user query 209, communicates adjudicator call 211 to NGAC database 202, receives access decision 212 from NGAC database 202, makes mediator response 210 based on access decision 212 in response to receipt of access decision 212, and communicates mediator response 210 to user 203 as a response to user query 209, such that resource database 201 calls an adjudicator API in an NGAC schema via adjudicator call 211 and obtains access decisions to controlled resource data 205 from access decision 212, wherein embedded next generation access control system 200 controls access by user 203 to row data and field data of controlled resource data 205 in resource database 201. In the process, NGAC database 202 can include adjudicator 208 and access control policy data 206, such that adjudicator 208 receives access control policy input 213 from administrator 204, makes access control policy data 206 based on access control policy input 213, receives adjudicator call 211 from resource database 201, checks access control policy data 206 about adjudicator call 211, determines control of access to controlled resource data 205 by user 203, makes access decision 212 based on the determination of control of access, and communicates access decision 212 to mediator 207. In an embodiment, embedded next generation access controller 215 can include resource database 201 and NGAC database 202 and can be implemented in the database schema for resource database 201, uses database views to change user query 209 to a policy preserving query, builds an access control list to facilitate computation of policy decisions, enforces policy within resource database 201 to user 203 and SQL editors, updates the list of columns in controlled resource data 205 in an absence of modifying the where clause in user query 209, and updates user query 209 so that only accessible columns are retrieved and other columns are returned as a static text 'protected' for every row in the scope of user query 209.

It should be appreciated that imposing fine-grained access control can include determining the sensitive data stored in the database and the level of protection required for each type of data. The process can define the access control policies by specifying the rules that will determine who is allowed to access the data and under what conditions. Further, the process can implement the access control policies by configuring the database to enforce the access control policies. This can be done using a variety of methods, such as role-based access control (RBAC) or attribute-based access control (ABAC). The process can monitor and audit the access control system by reviewing the access control logs to ensure that the system is working as intended and to identify any potential security breaches. The process can update the access control policies so that they remain aligned with security requirements.

In an embodiment, embedded next generation access control system 200 and imposing fine-grained access control can include the properties, functionality, hardware, and process steps described herein and embodied in any of the following non-exhaustive list:

a process (e.g., a computer-implemented method including various steps; or a method carried out by a computer including various steps);

an apparatus, device, or system (e.g., a data processing apparatus, device, or system including means for carrying out such various steps of the process; a data processing apparatus, device, or system including means for carrying out various steps; a data processing apparatus, device, or system including a processor adapted to or configured to perform such various steps of the process);

a computer program product (e.g., a computer program product including instructions which, when the program is executed by a computer, cause the computer to carry out such various steps of the process; a computer program product including instructions which, when the program is executed by a computer, cause the computer to carry out various steps);

a computer-readable storage medium or data carrier (e.g., a computer-readable storage medium including instructions which, when executed by a computer, cause the computer to carry out such various steps of the process; a computer-readable storage medium including instructions which, when executed by a computer, cause the computer to carry out various steps; a computer-readable data carrier having stored thereon the computer program product; a data carrier signal carrying the computer program product); a computer program product including comprising instructions which, when the program is executed by a first computer, cause the first computer to encode data by performing certain steps and to transmit the encoded data to a second computer; or a computer program product including instructions which, when the program is executed by a second computer, cause the second computer to receive encoded data from a first computer and decode the received data by performing certain steps.

Figure 3:
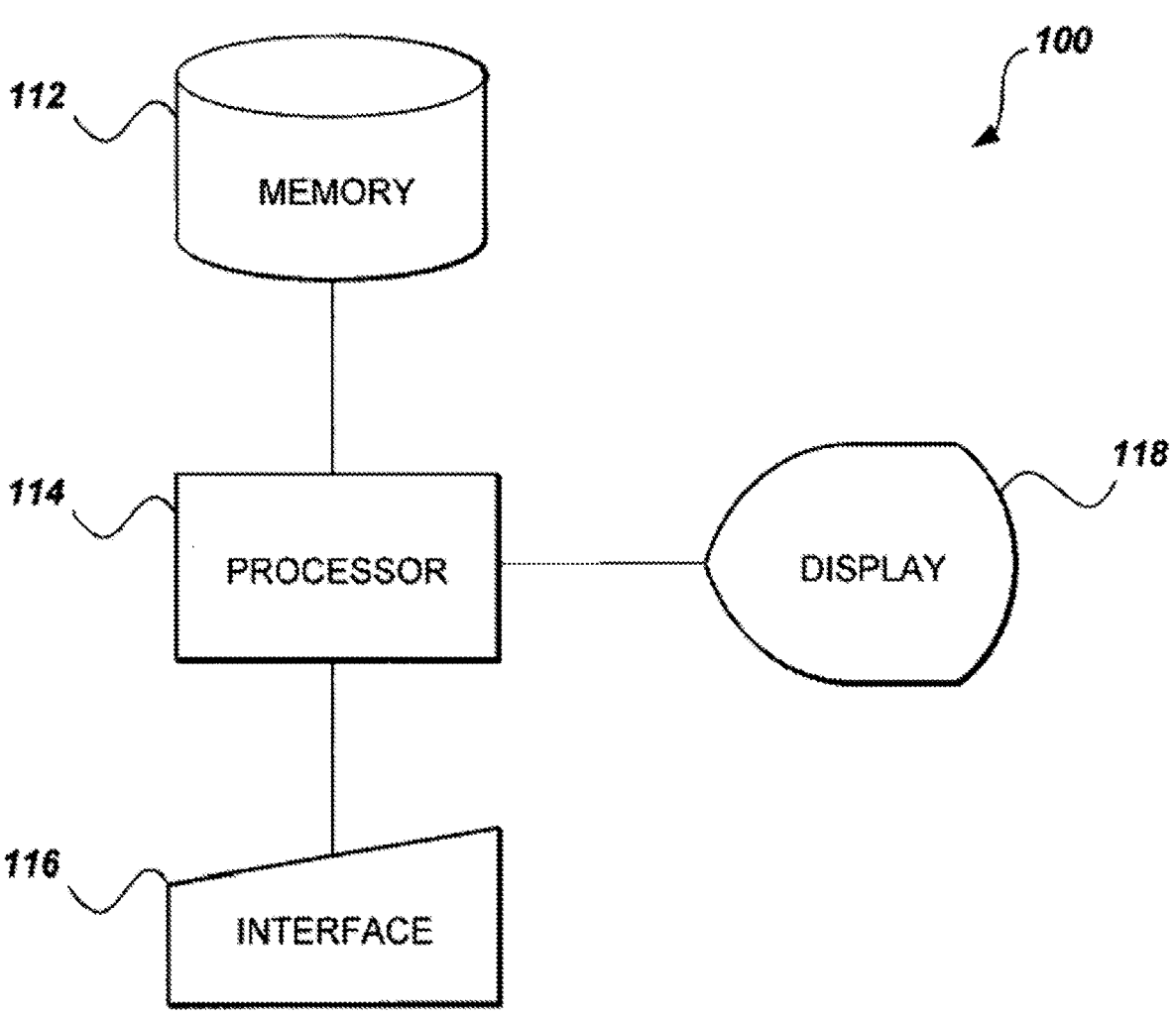
FIG. 3 shows, according to some embodiments, a system for computation and determination.

It should be understood that the calculations may be performed by any suitable computer system, such as that diagrammatically shown in FIG. 3. Data is entered into system 100 via any suitable type of user interface 116, and may be stored in memory 112, which may be any suitable type of computer readable and programmable memory and is preferably a non-transitory, computer readable storage medium. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable media include all computer-readable media except for a transitory, propagating signal.

Embedded next generation access control system 200 has several advantages over conventional technology for database protection. Embedded next generation access control system 200 provides fine-grained access control on data in resource database 201 so that users can be granted access to specific rows and columns of data, rather than entire tables or databases. This can be useful for protecting sensitive data or for ensuring that users only have access to the data they need. Embedded next generation access control system 200 is implemented in the database schema for resource database 201 so that it is integrated with the database and does not require any additional software or hardware. This can make it easier to deploy and manage the system. Embedded next generation access control system 200 can use database views to change user query 209 to a policy preserving query so that the system can enforce access control policies with or without modifying the original query. This can make it easier for users to access data, while still ensuring that they only have access to the data they are authorized to see. Embedded next generation access control system 200 can build an access control list to facilitate computation of policy decisions so that the system can quickly and easily determine whether a user is authorized to access a particular row or column of data. This can improve performance and reduce the load on the database server. Embedded next generation access control system 200 enforces policy within resource database 201 to user 203 and SQL editors so that the system can prevent users from accessing data that they are not authorized to see, even if they try to bypass the access control system. This can help to protect sensitive data from unauthorized access. Embedded next generation access control system 200 can update the list of columns in controlled resource data 205 in an absence of modifying the WHERE clause in user query 209 so that the system can automatically update the list of columns that a user is authorized to access, without requiring the user to modify their query. This can make it easier for users to access data, while still ensuring that they only have access to the data they are authorized to see. Embedded next generation access control system 200 can update user query 209 so that only accessible columns are retrieved, and other columns are returned as a static text 'protected' for every row in the scope of user query 209.

The conventional technology for database protection suffers from a number of disadvantages or technical limitations. Such are typically implemented as a separate module or layer on top of the database, which can add complexity and overhead. They may not be designed to be scalable to large databases or high-volume workloads. Embedded next generation access control system 200 overcomes these deficiencies of conventional technology by being implemented as a part of the database itself, using database views to change user queries to policy preserving queries, building an access control list to facilitate computation of policy decisions, enforcing policy within the database to user 203 and SQL editors, updating the list of columns in controlled resource data 205 in an absence of modifying the where clause in user query 209, and updating user query 209 so that only accessible columns are retrieved and other columns are returned as a static text 'protected' for every row in the scope of user query 209.

The articles and processes herein are illustrated further by the following Example, which is non-limiting.

EXAMPLE

Embedded next generation access control system (m-NGAC) imposes fine-grained access control on data stored in databases such as resource database 201. Here, m-NGAC leverages ANSI/INCITS Next Generation Access Control (NGAC). It embeds NGAC in the database and calls its API to enforce access control before a query executes, removing the need for implementing access control outside of the database. Consequently, regardless from where users issue the queries, m-NGAC allows access to the optimal amount of data permissible for the user. SQL editors cannot bypass this access control, making data fully secured.

Databases have a native access control system that is applied using GRANT statements for controlling access to tables and columns, but not rows and fields, i.e., individual column data. Conventionally, finer access control to sensitive data is implemented outside of the database, at the application level (in middle-tier or front-end). However, users can still see unprotected data using SQL editors. Furthermore, conventional practices do not provide a centralized point of control. All the applications that access the same data need to build and maintain separate access control approaches. Conventional databases lack field level access control in the protection of individual pieces of information stored in databases. Conventional technology that attempts to achieve fine-grained access control in databases intercept a query as a third-party tool outside of the database and modify SQL statements before they get executed for applying policy-based control to access data in a database, but this approach is flawed for reasons stated above.

It will be appreciated that m-NGAC solves these problems. Also, m-NGAC is a generic solution for any database for enforcing fine-grained access control from within the database. Accordingly, m-NGAC secures data even in SQL editors. This system achieves access control to the granularity of individual column data for every row. Whatever queries that a user issues, m-NGAC allows access to only an optimal set of permissible data. Such queries can be implemented via DML (Data Modification Language) queries that include four operations (SELECT, INSERT, UPDATE, DELETE) that (respectively) read, create, write, and delete data in tables. It is contemplated that m-NGAC can use ANSI/INCITS Next-Generation Access Control (NGAC), an attribute-based access control (ABAC) standard for imposing access control over database queries. Additionally, m-NGAC can include automatically generating object attributes for representing schema data and existing rows. The attributes are used in the expression of NGAC access control data and directly used by the methods in the enforcement of policies.

A conventional technology for access control is Next-generation Database Access Control (NDAC) that provides for accessing data in tables, rows, and columns in RDBMS products. NDAC imposes access control at the data level, removing the need for implementing and managing access control in applications or through the use of proprietary RDBMS mechanisms. With NDAC, the same policies can protect multiple databases from queries sent from multiple applications. Furthermore, NDAC provides control at the field level and to varying fields of select rows. NDAC provides granularity of control without the use of generation of policy-preserving WHERE clauses and masking or data redaction techniques. Operationally, users issue queries, and NDAC allows access to the data permissible for the user. NDAC includes an access manager for trapping and enforcing policy over SQL queries issued by applications and a translator for converting SQL statements to NGAC inputs and converting NGAC authorization responses to either an access deny or one or more permitted SQL statements. There are several differences between m-NGAC and NDAC. For one, m-NGAC is implemented right in the database schema, whereas NDAC is implemented in-between the database and the client. NDAC uses a SQL parser for translating SQL statements from an application to permitted SQL statements that are submitted to the database, while m-NGAC uses database views to automatically change user query 209 to policy preserving queries. Further, NDAC does not produce access control list (ACLs), while m-NGAC builds ACLs to further facilitate computation of policy decisions. Also, m-NGAC enforces policy by applying combinations of SQL functions, ACLs, views, and triggers. SQL editors may be able to bypass NDAC by connecting directly to the database, while m-NGAC enforces policy right from within the database to all the clients including SQL editors. Moreover, NDAC modifies the WHERE clause of the original query; however, the m-NGAC does not modify the WHERE clause and only updates the list of the columns. The query is updated in such a way that it only retrieves the accessible columns and other columns are returned as a static text 'protected' for every row in the scope of the query. The WHERE clause of the original query remains the same. NDAC uses a query parser to parse the query, which makes it harder to implement as queries get complex. Moreover, each vendor uses slightly customized SQL language, which makes it a customized solution for each database vendor, whereas m-NGAC does not require use of any parser, making it a global solution across all databases and is easier to implement.

It should be appreciated that m-NGAC is unique because it is a generic solution that can work for any database (with minimal modification) and protects SQL editors. Consequently, data is protected even for the system user (e.g., root user for MySQL), unless permitted in the policy. Moreover, m-NGAC embeds NGAC in the database by implementing NGAC algorithms (APIs) in SQL and calls these APIs to enforce access control before the query executes. This method builds Access Control Lists (ACLs), which are used to make access decisions. ACLs can be refreshed periodically (frequency can be configured depending on the requirement). NGAC can impose forms of mandatory, discretionary, and history-based access control policies. This system is a wrapper on top of the databases' native 'GRANT' access control system. Further, m-NGAC built for one database can be implemented for any other SQL database with slight changes. Furthermore, m-NGAC works for existing databases as well as new databases.

In m-NGAC, three components interact with each other: application, mediator, and adjudicator. A mediator is built in the resource schema, whose data needs to be protected. Adjudicator resides in the NGAC database schema, where access control policy is stored. Technically, NGAC schema can reside physically in the resource database or somewhere in the cloud. Regardless of where the NGAC schema resides, resource schema users will have no access to the NGAC schema. Internally, the mediator elements (in resource schema) access an adjudicator API (in NGAC schema) to get the access decisions. To recognize the logged-in application users, the same users are also created in the resource database. As opposed to conventional practices, the application will connect to the database with the same application user instead of connecting with a common database user with full application access. FIG. 1 shows a flow of transactions between these components. In this arrangement, user 203 issues query to mediator 207. Mediator 207 gets the info of user 203 who issued query 209 and passes it to adjudicator 202 along with the fields requested. Adjudicator 208 checks the policy, calculates the decisions, and responds to mediator 207. In the case of a SELECT query, mediator 207 modifies query 209 to retrieve only the granted columns per individual row, wherein the predicate (WHERE clause) is kept the same. In conventional technology, the predicate clause is modified instead of columns, and then the columns are masked if required. In case of UPDATE, INSERT, or DELETE clauses, mediator 207 does not modify queries. Then, SELECT query is issued to the database. The accessible data is returned to user 203. Columns with denied access are returned as 'Protected.' For UPDATE, INSERT, or DELETE, the query executes if granted, otherwise the entire transaction is denied with an appropriate error message.

Figure 2:
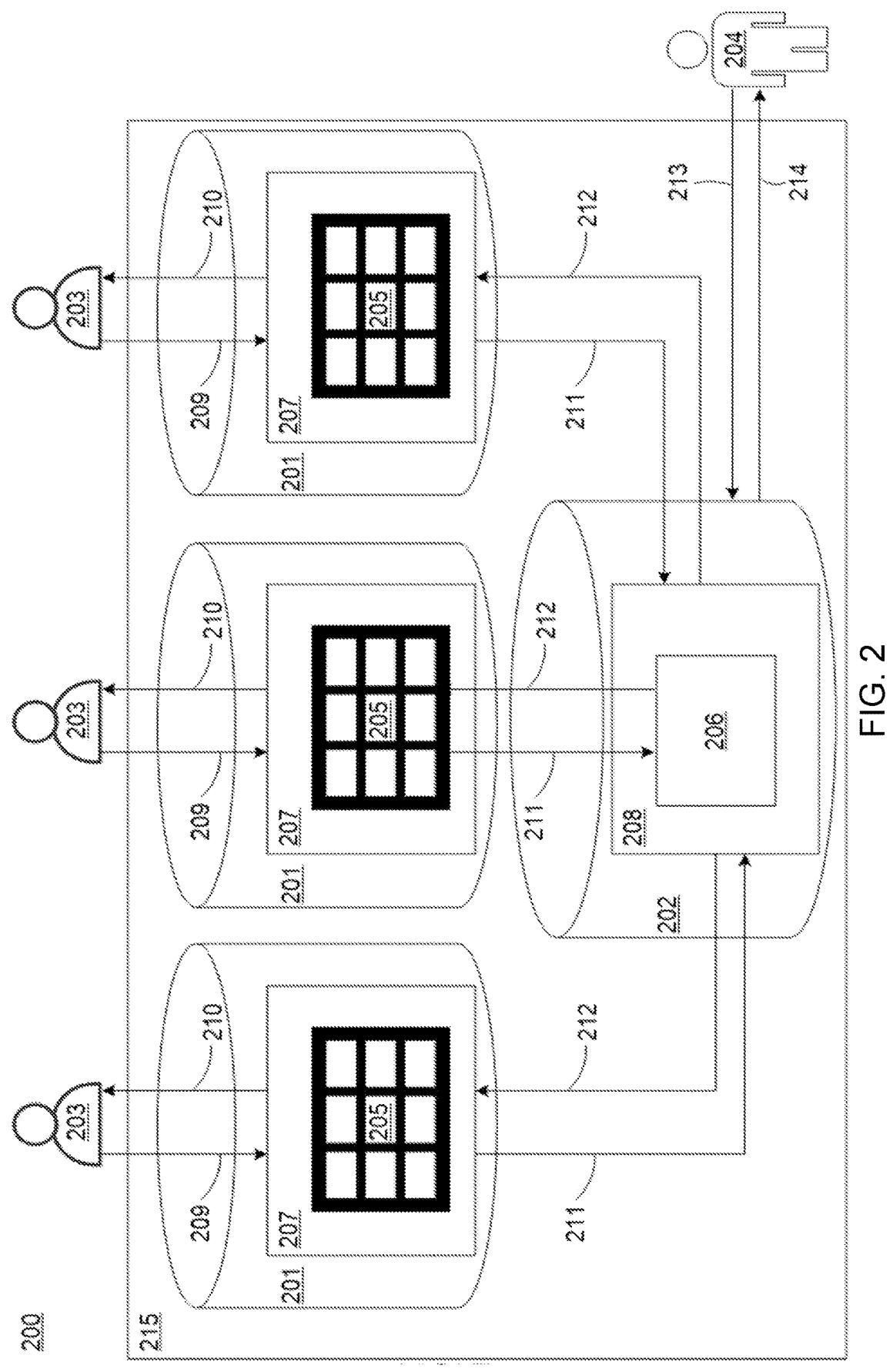
FIG. 2 shows, according to some embodiments, an embedded next generation access control system 200.

For multiple users 203, FIG. 2 shows m-NGAC with controlled access for each resource database 201. In this configuration, adjudicator 208 and the policies reside centrally in NGAC database 202. Multiple resource databases can connect to adjudicator 208 to get the access control decisions from respective policy.

Building policy can include importing resource schema tables and data in the form of object attributes and objects into the NGAC schema and assign them according to policy hierarchy; importing primary keys for the tables being protected in terms of objects; assigning them to the respective object attributes; making database users (from existing applications users) and granting basic access using database's GRANT statements; making user attributes and users in NGAC policy using assignments according to the user attribute hierarchy; and making permissions and denies in NGAC policy using associations and prohibitions.

With regard to the mediator, the access control mechanism is different for four different operations (SELECT, UPDATE, INSERT and DELETE). Here, SELECT controls read access (SELECT operation) to the users, wherein the tables are not directly exposed to any users. Users access views (acts as Mediator layer) to access data. The views are developed to make adjudicator calls from within the view's SQL. The views are constructed to check the adjudicator decision for every column (field) for every row in the table for the scope of the columns and rows in the issued SQL. If a field's access is permitted, the original column data is returned. If not, partial data is returned with denied data as 'Protected.' This behavior is configurable, e.g., denied data can be returned as 'not accessible' or can be left empty.

For UPDATE, INSERT, and DELETE, triggers ('before triggers') are implemented to function as mediator for these operations. Triggers call adjudicator functions to check permission to execute the operation requested. If granted, the execution continues; otherwise, the entire operation is denied with an appropriate reason (e.g., " . . . operation is not permitted for the user . . . for the table . . . "). There is no partial grant for these operations (unlike SELECT) due to data integrity issues. In case of DELETE, m-NGAC grants or denies a user's request to delete one or more rows in a database table. In the case of a grant, m-NGAC deletes the corresponding NGAC object attributes and relations to update the policy. The execution of INSERT statement creates a new row with specified column values in a specified table. Also, m-NGAC grants or denies a user's request to insert a row in the database, and in the case of a grant, subsequently creates NGAC object attributes and relations to update the policy.

The adjudicator resides in the NGAC schema, which contains NGAC algorithms. The adjudicator determines permissions the given user has on a given row and column; determines whether the user is permitted a given operation on a given column; determines which columns are accessed with what operations by a given user; provides ACLs for each user or user attribute in the policy; and provides prohibited ACLs for user or user attribute in the policy, if there are any.

Views, functions, stored procedures, and ACLs are implemented to build these algorithms. NGAC schema also stores the policy (DAG) in terms of nodes, assignments (hierarchy) and associations (permissions and prohibitions).

Making m-NGAC includes creating the policy, building the adjudicator, and building the mediator. Once the setup is completed, all queries to the resource database go through the mediator to get the controlled data. The user obtains only permissible data regardless of what application is used to query data.

It should be appreciated that NGAC is an access control framework that includes a standard set of data elements and relations that can be configured to express arbitrary access control policies in support of a wide variety of data services and applications. NGAC includes a generic set of operations that includes read and write operations that can be performed on resource data, and administrative operations for configuring (creating and deleting) the data elements and relations that represent policies. NGAC includes a standard set of functions for computing access control decisions and enforcing policy over user access requests to perform read/write and its administrative operations. NGAC is a flexible access control framework in that it can be molded in support of combinations of diverse access control policies. NGAC is not limited to SQL databases and can be applied to different types of applications such as file management (with controlled access to files and folders), workflow (achieving flow by using NGAC attributes/policy), and internal email (by controlling access to the attachment sent through emails). These features are demonstrated in the NIST Policy Machine. Expressing policies in terms of the NGAC attributes requires NGAC knowledge. However, NIST's administrative tool can be used to build policy without prior NGAC knowledge.

Accordingly, m-NGAC leverages NGAC to control access to data stored in databases. Benefits of using m-NGAC for access control include a central access control. m-NGAC removes the need for implementing and managing access control in applications with no SQL parsing required and no need to modify WHERE clause. With m-NGAC, the same policies can protect multiple applications. m-NGAC provides fine-grained access control down to the row and field (column) level. m-NGAC imposes access control from within the database, wherein SQL editors do not expose unprotected data. Moreover, m-NGAC is a global solution that can be implemented with any SQL database with minimum modification.

The processes described herein can be embodied in, and fully automated via, software code modules executed by a computing system that includes one or more general purpose computers or processors. The code modules can be stored in any type of non-transitory computer-readable medium or other computer storage device. Some or all the methods may alternatively be embodied in specialized computer hardware. In addition, the components referred to herein can be implemented in hardware, software, firmware, or a combination thereof.

Many other variations than those described herein can be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein can be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions can be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It can also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

PARTS LIST embedded next generation access control system 200
resource database 201
NGAC database 202
user 203
administrator 204
controlled resource data 205
access control policy data 206
mediator 207
adjudicator 208
user query 209
mediator response 210
adjudicator call 211
access decision 212
access control policy input 213
adjudicator feedback information 214
embedded next generation access controller 215
SELECT query 216
imposing fine-grained access control//imposes fine-grained access control

What is claimed is:

1. A computer-implemented process for imposing fine-grained access control on data in a resource database, the process comprising:
    receiving a user query from a user;
    making an adjudicator call based on the user query in response to receipt of the user query;
    communicating the adjudicator call to an NGAC (next generation access control) database;
    receiving an access decision from the NGAC database;

making a mediator response based on the access decision in response to receipt of the access decision; and
communicating the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database.

2. The computer-implemented process of claim 1, wherein the resource database comprises a mediator and controlled mediator data, such that the mediator receives the user query from the user, makes the adjudicator call based on the user query in response to receipt of the user query, communicates the adjudicator call to the NGAC database, receives the access decision from the NGAC database, makes the mediator response based on the access decision in response to receipt of the access decision, and communicates the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database.

3. The computer-implemented process of claim 1, wherein the NGAC database comprises an adjudicator and access control policy data, such that the adjudicator receives access control policy input from an administrator, makes the access control policy data based on the access control policy input, receives the adjudicator call from the resource database, checks the access control policy data about the adjudicator call, determines control of access to the controlled resource data by the user, makes an access decision based on the determination of control of access, and communicates the access decision to the mediator.

4. The computer-implemented process of claim 1, wherein the embedded next generation access controller comprises the resource database and the NGAC database, and is implemented in the database schema for the resource database, uses database views to change the user query to a policy preserving query, builds an access control list to facilitate computation of policy decisions, enforces policy within the NGAC database to the user and SQL editors, updates the list of columns in the query without modifying WHERE clause, and updates the user query so that only accessible columns are retrieved and other columns are returned as a static text protected for every row in the scope of the user query.

5. A system for imposing fine-grained access control on data in a resource database, the system comprising:
    one or more computers configured to perform operations, the operations comprising:
        receiving a user query from a user;
        making an adjudicator call based on the user query in response to receipt of the user query;
        communicating the adjudicator call to an NGAC database;
        receiving an access decision from the NGAC database;
        making a mediator response based on the access decision in response to receipt of the access decision; and
        communicating the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database.

6. The system of claim 5, wherein the resource database comprises a mediator and controlled mediator data, such that the mediator receives the user query from the user, makes the adjudicator call based on the user query in response to receipt of the user query, communicates the adjudicator call to the NGAC database, receives the access decision from the NGAC database, makes the mediator response based on the access decision in response to receipt of the access decision, and communicates the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database.

7. The system of claim 5, wherein the NGAC database comprises an adjudicator and access control policy data, such that the adjudicator receives access control policy input from an administrator, makes the access control policy data based on the access control policy input, receives the adjudicator call from the resource database, checks the access control policy data about the adjudicator call, determines control of access to the controlled resource data by the user, makes an access decision based on the determination of control of access, and communicates the access decision to the mediator.

8. The system of claim 5, wherein the embedded next generation access controller comprises the resource database and the NGAC database, and is implemented in the database schema for the resource database, uses database views to change the user query to a policy preserving query, builds an access control list to facilitate computation of policy decisions, enforces policy within the resource database to the user and SQL editors, updates the list of columns in the controlled resource data in an absence of modifying the where clause in the user query, and updates the user query so that only accessible columns are retrieved and other columns are returned as a static text protected for every row in the scope of the user query.

9. An embedded next generation access control system for imposing fine-grained access control on data in a resource database, the embedded next generation access control system comprising:

a resource database in communication with an NGAC database and a user and that comprises a mediator and controlled mediator data;

the NGAC database in communication with the resource database and an administrator and that comprises an adjudicator and access control policy data;

the administrator in communication with the NGAC database and that communicates access control policy input to the NGAC database upon which access control policy data are made in the NGAC database and receives adjudicator feedback information from the adjudicator;

the controlled resource data disposed in the mediator and that has access controlled by the access control policy data via calls of an adjudicator API by resource database in an NGAC schema to obtain access decisions;

the access control policy data disposed in the adjudicator;

the mediator disposed in the resource database and that comprises the controlled mediator data, such that the mediator receives a user query from the user, makes an adjudicator call based on the user query in response to receipt of the user query, communicates the adjudicator call to the NGAC database, receives an access decision from the NGAC database, makes a mediator response based on the access decision in response to receipt of the access decision, and communicates the mediator response to the user as a response to the user query, such that the resource database calls an adjudicator API in an NGAC schema via the adjudicator call and obtains access decisions to the controlled resource data from the access decision, wherein the embedded next generation access control system controls access by the user to row data and field data of the controlled resource data in the resource database;

the adjudicator disposed in the NGAC database and that comprises the access control policy data, such that the adjudicator receives the access control policy input from the administrator, makes the access control policy data based on the access control policy input, receives the adjudicator call from the resource database, checks the access control policy data about the adjudicator call, determines control of access to the controlled resource data by the user, makes the access decision based on the determination of control of access, and communicates the access decision to the mediator; and an embedded next generation access controller that comprises the resource database and the NGAC database and is implemented in the database schema for the resource database, uses database views to change the user query to a policy preserving query, builds an access control list to facilitate computation of policy decisions, enforces policy within the resource database to the user and SQL editors, updates the list of columns in the controlled resource data in an absence of modifying the where clause in the user query, and updates the user query so that only accessible columns are retrieved and other columns are returned as a static text protected for every row in the scope of the user query.

10. The embedded next generation access control system of claim 9, further comprising:

the user query that comprises information about the user and a request for data from the controlled mediator data, such that the data that is requested includes data arranged in a field of the controlled mediator data, and the information identifies the particular user that communicated the user query;

the mediator response that comprises any accessible data from the controlled resource data as determined by the access control policy data that is communicated from embedded next generation access controller to the user in response to the user query;

the adjudicator call that comprises the column data from the database requested by the user;

access decision that comprises the access control decision based on the access control policy data;

access control policy input that comprises instructions to build the access control policy data in the adjudicator; and adjudicator feedback information for exporting, auditing, and reporting.

11. The embedded next generation access control system of claim 9, further comprising:

the user in communication with the resource database and that uses a resource schema to obtain accessible portions of the controlled resource data in the resource database, communicates the user query to the resource database, and receives the mediator response from the resource database in response to communicating the user query to the resource database, such that the user has no access to the NGAC schema upon which access to all of the controlled resource data is controlled within the resource database.

12. The embedded next generation access control system of claim 9, wherein the user query comprises a query, and the query is a SELECT query.

13. The embedded next generation access control system of claim 12, wherein the mediator changes the query and retrieves only the granted columns per individual row per the access decision from the adjudicator.

14. The embedded next generation access control system of claim 12, wherein the user query further comprises a WHERE clause that is unchanged by the mediator.

15. The embedded next generation access control system of claim 12, wherein accessible data in the controlled resource data is communicated to the user in the mediator response, and columns in the controlled resource data with denied access are communicated to the user as protected in the mediator response.

16. The embedded next generation access control system of claim 9, wherein the user query comprises a query selected from the group consisting of an UPDATE query, an INSERT query, and a DELETE query.

17. The embedded next generation access control system of claim 16, wherein the mediator does not modify query columns.

18. The embedded next generation access control system of claim 16, wherein the user query further comprises a WHERE clause that remains unchanged.

19. The embedded next generation access control system of claim 16, wherein the query is executed if the query is granted, and the query is not executed if the query is denied.

20. The embedded next generation access control system of claim 9, wherein the adjudicator determines permissions the user has on a given row and column of the controlled resource data in the resource database;

wherein the adjudicator determines if the user is permitted a given operation on a given column of the controlled mediator data;

wherein the adjudicator determines which columns of the controlled resource data are accessed with what operations by the user;

wherein the adjudicator provides an access control list for each user and user attribute in the access control policy data; and wherein the adjudicator provides a prohibited access control list for the user and user attributes in the access control policy data if there are any.

\* \* \* \* \*